United States Patent [19]

Shah et al.

[11] 4,446,055

[45] May 1, 1984

[54] MODIFIER FOR EFFECTING PHYSICAL PROPERTIES OF FOOD AND FOOD GRADE COMPOSITIONS

[75] Inventors: Syed M. M. Shah; Anthony J. Luksas, both of Chicago; Salah E. Ahmed, La Grange Park, all of Ill.

[73] Assignee: Beatrice Foods Co., Chicago, Ill.

[21] Appl. No.: 17,978

[22] Filed: Mar. 6, 1979

[51] Int. Cl.$^3$ .............................................. B01F 17/00
[52] U.S. Cl. ................... 252/351; 426/570; 426/583; 426/573; 426/601; 426/605; 426/602; 426/656; 424/359; 424/49; 424/64; 424/69; 252/357
[58] Field of Search ....................... 252/351, 352, 357; 426/570, 583, 573, 601, 602, 605, 656, 657, 654, 589, 599; 424/359, 49, 64, 69

[56] References Cited

U.S. PATENT DOCUMENTS

| | | | |
|---|---|---|---|
| 3,015,611 | 1/1962 | Smedresman | 426/583 |
| 3,560,220 | 2/1971 | Gerow et al. | 426/583 |
| 3,615,661 | 10/1971 | Ellinger | 426/583 |
| 3,982,039 | 9/1976 | Scibelli et al. | 426/583 |
| 4,029,825 | 6/1977 | Change | 426/583 |
| 4,081,555 | 3/1978 | Sawhill | 426/583 |
| 4,143,174 | 3/1979 | Shah et al. | 426/583 |
| 4,187,323 | 2/1980 | Gidlow | 426/583 |
| 4,209,503 | 6/1980 | Shah et al. | 424/49 |
| 4,253,386 | 3/1981 | Egnell | 426/583 |
| 4,283,435 | 8/1981 | Lauck | 426/583 |

*Primary Examiner*—Josephine Barr
*Attorney, Agent, or Firm*—Murray & Whisenhunt

[57] ABSTRACT

There is provided a food-grade modifier comprising a substantially water-insoluble neutralized solid complex precipitate of calcium, phosphorous and at least one amino acid selected from tyrosine, lysine and aspartic acid. Optionally, the complex may include at least one further amino acid selected from tryptophan and phenylalanine. The modifier effects stabilization, suspension, emulsification and the like in food or non-food compositions, e.g. for providing a whipped topping. The process comprises precipitating the complex from a specifically neutralized medium containing the amino acid, calcium and phosphorous.

21 Claims, No Drawings

MODIFIER FOR EFFECTING PHYSICAL PROPERTIES OF FOOD AND FOOD GRADE COMPOSITIONS

The present invention relates to a modifier for effecting changed physical properties in conventional compositions, especially food and food-grade compositions. The so-modified properties may include, inter alia, suspension, stabilization, emulsification, thickening, gelling and viscosity control. More particularly, the invention relates to a synthetic whey colloidal precipitate modifier which can achieve property modifications similar to those achieved with natural whey colloidal precipitate.

BACKGROUND OF THE INVENTION

In U.S. application Ser. No. 598,873, filed July 24, 1975, now U.S. Pat. No. 4,143,174 and entitled "Food Composition Containing Whey Colloidal Precipitate", there is disclosed a modifier of the present nature, which is a non-proteinaceous colloidal precipitate of whey. Basically, the whey colloidal precipitate is the product of a process having at least one step of (a) raising the pH of whey to at least 5.8 and (b) heating the whey to a temperature of at least 80° C., for a time sufficient to produce the said precipitate. The whey colloidal precipitate is also identifiable as a complex precipitate which in aqueous suspension has an average particle size of less than 10 microns, is essentially white in color, exhibits no disagreeable taste in aqueous suspensions of up to 30%, can be dried to a free-flowing powder, and is capable of gelling water and petroleum ether. The whey colloidal precipitate must be produced from whey which has been priorly sufficiently deproteinated so that 5% by weight of trichloroacetic acid therein will not yield more than 5% by weight of precipitated protein.

As a typical example of a process for producing the whey colloidal precipitate, acid whey is suspended in water and heated to approximately 100° F., with stirring, to dissolve the acid whey and disperse the non-soluble fractions in water. This dispersion/solution is then passed through an ultra-filtration membrane, e.g. Westinghouse D-150*, and the permeate from the membrane is collected as an essentially protein-free fraction. The permeate is slowly treated with a base, e.g. potassium hydroxide, to raise the pH of the permeate from the usual pH level of about 4.4 to a pH of at least 5.6 where the whey colloidal precipitate commences to precipitate from the permeate. Increasing the pH by further additions of base will precipitate more of the whey colloidal precipitate, although at a pH of about 7.2, most of the whey colloidal precipitate has been recovered. Alternately, or in addition thereto, the permeate may be heated, e.g. to about 180° F., to achieve the further recovery of the whey colloidal precipitate.

*Trademark

The whey colloidal precipitate may be recovered from the permeate by filtration, decanting and the like, or it may be used in its wetted or dried form.

As an example of use of the whey colloidal precipitate, it may be incorporated into a conventional dry powdered whipped topping to provide foam stabilization for the reconstituted and whipped powder.

As can be appreciated, since the whey colloidal precipitate is derived from whey, it is food-grade, and in a sense, can be considered a food. Thus, it can be used in food and food-grade compositions in any desired amount without compromising the food or food-grade status of the resulting composition. The versatility of the whey colloidal precipitate in effecting the various physical properties, noted above, also provides a unique advantage in that a single ingredient can be used for many different purposes in such compositions. Thus, a substantial advantage to the art is provided by the whey colloidal precipitate.

However, as can also be appreciated, since the whey colloidal precipitate is derived from whey, production thereof is based on available supplies of whey, and the process for producing and recovering the whey colloidal precipitate, while relatively simple and straightforward, does involve rather substantial processing of whey, especially in that relatively large volumes of whey must be handled in order to produce substantial amounts of the whey colloidal precipitate.

In the above noted application, the whey colloidal precipitate is identified in the manner described above, and it will be noted that the precipitate is a complex precipitate from essentially deproteinated whey. The chemical composition of the complex precipitate was not identified, particularly due to the difficulties of such an analysis. Accordingly, the whey colloidal precipitate and its advantages to the art could only be provided by processing whey, as described above, and is referred to as natural whey colloidal precipitate.

In view of the above, it would be of substantial advantage to the art to directly produce a modifier having properties similar to whey colloidal precipitate, but without the necessity of deriving that modifier from whey. This would avoid the necessity of handling the large volumes of whey, along with the attendant processing thereof, and would assure a consistent modifier, as opposed to the variability of modifier produced from whey, bearing in mind that the composition of whey can vary with the source, the processing details and the particular cheese from which the whey is derived.

OBJECTS OF THE INVENTION

It is therefore an object of the invention to provide a modifier in the nature of whey colloidal precipitate, but which modifier may be obtained by the reaction of known and identifiable ingredients.

It is a further object of the invention to provide a process for the production of such modifier, wherein the process does not utilize whey as the starting material and, accordingly, can be carried out more conveniently and expeditiously than the process for producing whey colloidal precipitate. Other objects will be apparent from the following specification and claims.

BRIEF DESCRIPTION OF THE INVENTION

Thus, the present invention provides a food-grade modifier which is produced by direct reaction between the ingredients thereof and which does not use whey as the basic ingredient for the process.

The invention is based on several primary discoveries. The first discovery is that the non-proteinaceous complex precipitate, identified in the aforenoted application as whey colloidal precipitate, is actually a complex precipitate of amino acids, peptides and, possibly, polypeptides. Apparently, a number of amino acids and peptides are involved in this complex precipitate. Due to the nature of the complex, it has not been possible to identify all of these amino acids and peptides, or the proportions thereof in the whey colloidal precipitate. However, by experimenting with a number of amino acids, it has been discovered that certain amino acids may be complexed in a precise manner to give a complex precipitate which approximates the functional properties of whey colloidal precipitate.

The second discovery upon which the present invention is based is that certain elements are necessary to form the complex of the certain amino acids. Otherwise the complex will not provide functionalities, e.g. suspension, emulsification, thickening, etc., similar to that of whey colloidal precipitate. These critical elements are calcium and phosphorous.

Finally, the invention is also based on the discovery that the specific amino acids of the present invention, along with the calcium and phosphorous, must be complexed in a precise manner in order to achieve a complex precipitate which will approximate the functionalities of the whey colloidal precipitate. Basically, the process requires neutralizing a precipitating medium which contains the certain amino acids, calcium and phosphorous, wherein the neutralization is carried out in a specific manner. With this process, the correct complex between the calcium, phosphorous and certain amino acids is achieved, and the resulting complex precipitate will approximate the functionalities of whey colloidal precipitate.

Thus, there is provided a food-grade modifier comprising a substantially water-insoluble, substantially neutralized solid complex precipitate of calcium, phosphorous, and at least one amino acid selected from the group consisting of tyrosine, lysine and aspartic acid, and mixtures thereof. Optionally, the complex precipitate may also contain the amino acids tryptophan, phenylalanine and mixtures thereof. The complex precipitate, ideally, will have a pH of between 6.0 and 7.5, as measured in the liquid medium from which the precipitate forms. The precipitate, similar to whey colloidal precipitate, is filterable and thus may be recovered in a wetted form from the precipitating medium, or alternately may be dried to a free-flowing powder for convenient subsequent use. Thus, the modifier may be mixed with a food or food-grade material to effect the functionalities, described above, in the resulting composition, e.g. the food material may be an oil or a fat in the form of a suspension or emulsion with the complex precipitate modifier being at least partially the suspending or emulsifying agent.

It will also be appreciated that while the present modifier is a food-grade modifier, it can be used in non-food or non-food-grade uses. Thus, it can be used as a suspension or stabilizing agent for latex paint or can be used in a gel where the complex precipitate is at least partially the gelling agent, e.g. the gel is an aqueous/organic gel, for example the gelling of petroleum ether.

According to another aspect of the invention, there is disclosed a process for producing the complex precipitate modifier comprising providing an aqueous precipitating medium, adding to the medium a calcium containing compound, acidifying the medium by adding a phosphorous containing acid, until a pH of 4.0 or less is reached, adding to the acidified medium one or more of the said amino acids, neutralizing the acidified medium and amino acids with a base until a pH of between 6.0 and 7.5 is reached, and allowing the complex precipitate modifier to form from the neutralized medium.

Alternatively, there is disclosed a process for producing the complex precipitate modifier comprising providing an aqueous precipitating medium, acidifying the medium by adding to the medium a phosphorous containing acid until a pH of 4.0 or less is reached, adding to the acidified medium at least one of the said amino acids, neutralizing the acidified medium and amino acids with a calcium containing compound until a pH of between 6.0 and 7.5 is reached, and allowing the complex precipitate modifier to form from the neutralized medium.

In both processes, the complex precipitate is filterable from the medium and may be recovered either in a wetted form or dried to a free-flowing powder for convenient subsequent use.

It should be fully understood that the present modifier differs from the whey colloidal precipitate. Apparently, the whey colloidal precipitate is composed of a number of amino acids and peptides (and possibly polypeptides) which are complexed with a number of different elements. This complexing results in a complex colloidal precipitate which is substantially different from the complex precipitate of the present invention. The present invention could be considered as a more simple complex, although it is clear that the present complex is substantially different from whey colloidal precipitate in terms of the complex per se and the constituents thereof. Nevertheless, the present more simple complex does provide functionalities similar to the whey colloidal precipitate, although it is to be understood that the functionalities are not of the extent, efficiency and effectiveness of the whey colloidal precipitate. Further, the present functionalities vary from the functionalities of the whey colloidal precipitate, depending upon the particular amino acids used, the ratios thereof, along with the ratios of the elements calcium and phosphorous. From an overall point of view, the present modifier can be considered as approximately 75% as effective as whey colloidal precipitate. However, owing to the reproduceability of producing the present modifier, and to the ease of production thereof, the present modifier can effectively function in many compositions in lieu of the whey colloidal precipitate and thus, provides a substantial advantage to the art.

DETAILED DESCRIPTION OF THE INVENTION

The substantially non-proteinaceous modifier of the present invention is basically a complex formed between the specific and critical amino acids, calcium and phosphorous. A variety of complexes will form between various amino acids and various ions. However, out of the many complexes which can be formed, only a very limited number of the complexes will have functionalities similar to whey colloidal precipitate. In most cases, these other complexes will have none or very few of those functionalities, and, accordingly, are not useful in the present invention. It is only those complexes formed from one or more of the amino acids tyrosine, lysine and aspartic acid which will provide functionalities of the present nature, and which are useful in the present invention. This is, of course, a very limited number of very specific amino acids from the many possible amino acids. However, as is well known to the art, amino acids can be reacted to form derivatives thereof. These derivatives are prepared by reacting active groups on the amino acid side chains. Typical derivatives are alkylated derivatives, e.g. lower alkyl or cycloalkyl, salt derivatives, e.g. alkaline and alkaline earth salts, and ester derivatives, e.g. lower alkyl esters. Optionally, in lieu of lower alkyl, lower alkenyl and lower alkynyl may be used. These derivatives are known to the art and will not be described herein for the sake of conciseness. However, these derivatives are considered for the purposes of the present specification and claims as though they are the present amino acids, per se, and the present specification and claims should be interpreted in that such derivatives are included therein.

Tryptophan and phenylalanine are optional amino acids which may be included in the complex precipitate. They cannot be used in lieu of the critical amino acids for the invention, but only in combination with one or more thereof. Again, the conventional derivatives of these amino acids may be used, and the specification and claims should be so construed. The ratio of these optional amino acids to the critical amino acids can vary, of course, from zero to any desired amount. However, with increased proportions of the optional amino acids, the functionality of the resulting complex precipitate decreases. While as much as 50% of the amino acid content of the complex precipitate could be one or both of the optional amino acids, and still achieve sufficient functionality for many applications, it is preferred that the optional amino acid content of the complex precipitate be no more than 30% and ideally no more than 25%.

The amino acids may be used in the complex in pure or impure form. Typically, amino acids of this nature are prepared from naturally occurring sources and commercial sources of the acids may contain impurities from those natural sources. These impurities do not substantially affect the functionalities of the present complex precipitate in usual impure form, but the degree of purity of the amino acids should be considered in proportioning the amino acids for the complex precipitate. Of course, if essentially pure amino acids are used, and commercial sources are available, then no such proportioning is required.

Since the present modifier is a complex of the amino acids, calcium and phosphorous, these ingredients must be placed in a condition wherein the complex may form. The calcium and phosphorous must be placed in a substantially ionized form, and it is for this reason that the pH and neutralization steps, briefly discussed above, are required. The particular calcium and phosphorous compounds used are not important so long as the compounds, within appropriate pH conditions, can be at least partially ionized. Thus, for example, the calcium may be in the form of the oxide, hydroxide, carbonate, acetate, aluminate, silicate, fluoride, chlorate, laurate, palmatate, phosphate, phosphite, sulfate, sulfite and related compounds. It should be noted that when the phosphate or phosphite is involved, that source of phosphorous should be taken in account in proportioning the calcium and phosphorous for the complex precipitate.

Similarly, the phosphorous containing acid is not critical but conventional phosphoric acid or phosphorous acid are preferred. Here again, the form is not critical and the ortho, pyro, meta, and hypo forms may be used. Neither is the acid concentration critical, but diluted acids only increase the bulk of liquid which must be handled. Accordingly, relatively concentrated phosphorous containing acid is preferred.

The present modifier may be characterized in that it is a substantially water-insoluble, solid complex which can be filtered from the precipitating medium and dried to a free-flowing powder. It may also be characterized in that the modifier is substantially neutralized. Thus, the complex precipitate will have a pH of between 6.0 and 7.5, as measured in the liquid medium from which the precipitate forms, which will correspondingly determine the pH of the complex precipitate. Although not desired, the pH can be as low as 5.5 and as high as 8.0.

The modifier can also be characterized in that it is a complex. The exact nature of the complex is unknown, and while not being bound by theory, it appears that the complex between the calcium/phosphorous/amino acid form ionic and other similarly charged bonds to produce an association of the amino acid/calcium/phosphorous in the nature of the complex macro molecules. This term is intended to reference an association of a plurality of the amino acids in such a manner that the association exhibits propoerties different from the properties of the unassociated amino acids. In this regard, the complex precipitate is substantially water-insoluble in that very little of the complex precipitate will dissolve in water at room temperature. Some solution may take place, depending upon the particular amino acid and proportions thereof between calcium and phosphorous, but even within this latitude, solubility would be characterized as slight. In the presence of water, the complex precipitate associates with water in a yet unknown way, to substantially modify the properties of water and water-containing compositions. Similarly, the complex precipitate will associate with other liquids, e.g. organic liquids such as petroleum ether, fats, oils and the like, to substantially alter the function of those organic liquids in compositions. The gelling of petroleum ether by the present modifier is an example thereof.

The modifier can also be characterized in that it is filterable, e.g. by decantation, conventional filter media, centrifuging and the like. The substantially water-insoluble complex precipitate can thus be separated from the precipitating medium and rendered into many convenient forms. It can be used as the precipitating medium wetted complex precipitate, e.g. obtained simply by decantation, and cetrifugation, or it can be rendered in a free-flowing dry powder form simply by removing the complex precipitate from the precipitating medium and drying in any desired conventional manner, e.g. oven driers, pan driers, roller driers, spray driers and the like.

The properties of the complex precipitate modifier, in terms of the functionalities, can be varied, depending upon the ratio of calcium to total critical amino acid in the complex precipitate, as well as the ratio of calcium to phosphorous. However, generally speaking, the ratio of calcium to amino acid is from 5:1 to 0.5:1. Outside of this range, the effectiveness and functionality of the complex precipitate is substantially decreased. This does not mean, however, that the amount of calcium in the precipitating medium cannot be outside of this upper limit, since once the precipitate forms, excess calcium will simply remain in the precipitating medium. Nevertheless, to insure careful control of the complex precipitate, ratios of calcium to amino acid, disposed in the precipitating medium, should be in the above ranges. More preferably, the ratio of calcium to amino acid in the complex precipitate and in the precipitating medium will be between 2:1 and 1:1.

Similarly, for best results, the ratio of calcium to phosphorous in the complex precipitate is from 4:1 to 0.5:1, although it is preferred that this ratio be from 2:1 to 1:1. Here again, excess phosphorous in the precipitating medium can be tolerated, but is not preferred.

The modifier of the invention is admixed with a material for affecting the functional properties thereof. As noted above, this material may be a food-grade or food material, although other materials may be used. Nevertheless, it is an important advantage of the present invention that the present modifier is a food-grade material and may be used in food and food-grade compositions in any desired amounts. However, functional properties are usually not affected in such compositions when the amount of the complex precipitate exceeds about 40% of the composition. Thus, the composition into which the complex precipitate is admixed, will normally contain 40% or less of the complex precipitate. In food-grade materials or in food materials, even these higher amounts can be readily tolerated since the modifier is essentially white in color and exhibits essentially no disagreeable taste in amounts of up to 40% by weight of the composition. The amount used in any particular composition will vary with the functionality intended. For example, relatively high concentrations will be used for stabilizing a whipped topping or a mayonnaise and lower concentrations will be used for stabilizing an oil/vinegar salad dressing. When the functionalities to be effected are in connection with aqueous compositions, i.e. the complex precipitate function via association with the water of the composition, generally speaking, the precipitate will be contained in the composition in an amount from as little as 0.1% to as high as 30%, based on the weight of the water in the composition. For most compositions, however, and especially for most food compositions, the amount will be between about 0.5% e.g. about 1 to 2% to about 20% to 25% or less, e.g. about 15%.

By way of illustration, the modifier can be used for forming extended stability of an emulsion of fat or oil in water or aqueous medium. Thus, a conventional Italian-style salad dressing may be prepared with the present modifier. Traditional Italian-style salad dressing will be a mixture of oil, e.g. olive oil, vinegar, optionally with water, dissolved and suspended flavorings, e.g. salt, spice, cane sugar and the like. By including in the composition from 1 to 10% of the modifier, the emulsion produced by shaking the mixture will remain stable for considerable lengths of time, the greater the concentration the longer the stability. For example, at even relatively low concentrations of about 2 to 3%, the emulsion stability of the so-prepared salad dressing may be from 1 to 7 hours, depending on the ratio of water to oil, suspended spices and the particular ratios within the complex precipitate of amino acid/calcium/phosphorous.

Another advantage of the present modifier is that it is compatible with conventional modifiers. Thus, it may be used in such compositions as either the sole modifier or in combination with conventional modifiers as a replacer therefor. Thus, to achieve specific emulsion properties, the salad dressing may contain both the present complex precipitate and conventional emulsifying agents.

While there is no basic difference in the use of the modifier in compositions other than food-grade and food, the functionality to be achieved may differ. Thus, for paints, pharmaceutical carriers, topical mantels and the like, a high degree of thickening or gelling of organic liquid may be desired. In these cases, the modifier will be included in the composition in the same relative ranges as described above, with or without the inclusion of water. Alternatively, the modifier may be used to stabilize and thicken either oil or water base paints. It may be used as a flow control agent in mucilages and glues, or other coatings.

In preparing the complex precipitate, it is necessary that the amino acid, calcium and phosphorous be placed in conditions that the complex precipitate can form. Thus, a precipitating medium must be used. This medium, under the conditions of the process, must be capable of at least partially ionizing the calcium and phosphorous. Other than this requirement, the particular medium is not critical. In one embodiment the calcium containing compound is added to the precipitating medium. If the calcium compound is not soluble in that medium, e.g. calcium carbonate or calcium hydroxide and water, then provisions must be made to solubilize the calcium containing compound. Suitably, insoluble calcium containing compounds are solubilized as the precipitating medium is acidified. Thus, a phosphorous containing acid is added to the medium to acidify same. Alternately, other phosphorous compounds may be added to the medium along with another acid, e.g. mineral acid, to acidify the medium. However, since the phosphorous compound must be at least partially ionized, the combination of the phosphorous containing compound and acid must accomplish ionization thereof, and in doing so will form, in situ, a phosphorous containing acid, and the specification and claims should be so construed.

After the medium has been acidified to a pH of 4.0 or less, and especially 2.0 or less or even 1.0 or less, the amino acid is added to the acified medium. The conditions are now correct for forming the complex precipitate. At this pH, however, the complex precipitate will not form. The acidified medium, with the amino acid therein, is neutralized by adding a base until a pH of 5.5 is reached and more preferably 6.0. At this pH, the complex precipitate begins to form. The particular base is not critical, and can be chosen from any of the alkaline or alkaline earth bases or the like, such as sodium hydroxide, potassium hydroxide or the like, or if desired, ammonium hydroxide may be used. The medium is neutralized to a pH as high as 8.0, although a pH of 7.5 or less is preferred. At pH's of above about 7.5, free calcium hydroxide may begin to form and such formation, especially at more basic pH's can adversely affect the complex precipitate when placed in many compositions by virtue of the free calcium hydroxide. At a pH of below 6.0, and especially below 5.5, little of the precipitate is formed, and hence neutralization must be at least to those pH ranges.

After the acidified medium is substantially neutralized, as explained above, the complex precipitate is allowed to form in the neutralized medium. No particular provisions are required for allowing the precipitate to form, and simply allowing the precipitate medium to remain at rest or with gentle stirring is sufficient. While not necessary, either prior to or during the precipitating step, the neutralized medium may be heated to less than 100° C., although this is not required.

Thereafter, the complex precipitate is simply filtered from the neutralized medium, and recovered in a conventional manner, as explained above.

As an alternative, the neutralization may be approached from the opposite direction. Thus, instead of first adding the calcium containing compound to the precipitating medium, that medium is acidified by adding a phosphorous containing acid until a pH of 4.0 or less is reached (and preferably the lower pH's noted above). After adding the amino acid, the acidified medium containing the amino acid is neutralized with a calcium containing compound until a pH of between 5.5 and 8.0, and especially between 6.0 and 7.5, is reached. This avoids the necessity of using a separate base for achieving neutralization. Otherwise, the process is carried out in the same manner as described above, and all of the parameters of the process are equally applicable to this form thereof, e.g. recovery of the complex precipitate by filtering and heating during precipitation.

The theoretical explanations for causing the complex precipitate to form in the above manner is not understood, but at the lower pH's opportunities for ionic bonding of the nature described above are presented, and the association of amino acid/calcium/phosphorous can be achieved. The pH of 4.0 or less is required for this association, although lower pH's are advantageously used. Thus, the medium may be advantageously acidified to a pH of less than 3.0 or even less than 2.0, or even less than 1.0, which will facilitate formation of the complex precipitate upon neutralization.

While not necessary, the pH range desired during the precipitating step can be maintained with the use of conventional buffers. Of course, other techniques such as seeding with previously prepared complex precipitate, ultrasonic vibration and other vibrations may be used, although they are not necessary.

As explained above, the ratio of calcium to amino acid and calcium to phosphorous in the precipitating medium may be outside of the ranges of those ratios which should ultimately appear in the complex precipitate. It is preferred that the same ranges, discussed above, of calcium to amino acid and calcium to phosphorous which are to ultimately appear in the complex precipitate be used in the precipitating medium. Also, preferably, in both forms of the process, the precipitating medium is simply water for ease of operation and convenience. The volume of precipitating medium to the weight of amino acid/calcium/phosphorous is not critical, and may be any volume convenient for handling. However, excess precipitating medium only increases the bulk of liquid which must be handled. Thus, usually, the ratio of the weight of the combination of amino acid/calcium containing compound/phosphorous containing acid to the volume of precipitating medium will normally be no greater than 0.25:1 and usually less than 0.1:1 and more preferably 0.5:1.

While the entire precipitating medium with the complex precipitate therein may be added to a composition for effecting modification of its properties, this simply constitutes a diluent of the complex precipitate and is therefore not preferred. However, in certain food-grade or food materials, water is an ingredient thereof, and since water is the preferred medium, in these cases, the entire precipitating medium and complex precipitate can be added to the food-grade or food material. Nevertheless, normally, the complex precipitate is filtered from the neutralized medium, and the filtered complex precipitate is then added to a food-grade or food material as well as other materials, as explained above.

The food, of course, may be any of the animal, dairy or vegetable origin foods, and may be a solid or liquid. The food may be contained in a composition such as a solution, suspension, gel or solid. The particular food and the particular form thereof is not critical to the invention, and may be simply as desired. A food-grade material, on the other hand, is any material which is not normally considered a food, but may be ingested by an animal, including humans. Thus, pharmaceutical carriers, cosmetics (lipsticks, face creams and bases), toothpastes and mouthwashes are compositions which may be ingested and hence are designated as "food-grade".

Thus, it will be seen that the present modifier may be used in the same manner as the whey colloidal precipitate. For conciseness, details of that application will not be repeated, and the entire disclosure of Ser. No. 598,873 is incorporated herein by reference and relied upon.

The complex precipitate may be incorporated into the compositions in any desired manner. For example, the complex precipitate may be simply dispersed in a suitable liquid, e.g. water, alcohol and mixtures thereof, and added to the composition. Alternately, the composition may be added to a suspension of the complex precipitate. Usually, mixing will be required to provide adequate suspension of the complex precipitate in the composition.

The present modifier is of particular importance to the art in that thick emulsions may also be prepared, such as mayonaisse and whipped topping. Thus, a conventional whipped topping may be prepared which comprises its usual ingredients of water, fat, protein and emulsifiers. A similar topping may be prepared with the present complex precipitate being substituted for either all or part of the protein and emulsifiers and the whipped topping will be stable for considerable periods of time.

Also the present complex precipitate may be used simply as a thickening agent. For example, a small amount of an artificial cheese flavor may be prepared in a water carrier, and the flavor profile thereof may have the intensity of a cheese sauce prepared from natural cheese. However, the mouth-feel and consistency thereof will not approximate a good cheese sauce. When sufficient conventional thickening agents, such as cornstarch and flour are incorporated into the compositions, the taste of the flour and cornstarch substantially depletes the taste of the artificial cheese flavor and an inordinate increase in the amount of the artificial cheese flavor is required, or the diluted flavor will make the cheese sauce less than totally acceptable. By using the present complex precipitate to thicken such flavored solutions or suspensions, the correct consistency and mouth-feel may be achieved without sacrificing the level of flavor in the sauce. The degree of thickening may be as desired and can range from as low as that consistent with thin syrups (for example a sugar solution thickened with the present precipitate to mimic a boiled syrup) to viscosities in the nature of emulsified desserts and sauces.

The invention will be illustrated by the following examples, wherein all percentages therein as well as in the preceding specification and following claims, are by weight unless otherwise indicated. It is to be understood that the invention is not limited to these examples, and extends to the breadth of the foregoing specification and the following claims.

EXAMPLE 1

The modifier was prepared from the following ingredients (stated in terms of grams and milliliters for convenience):

| | |
|---|---|
| Water | 100 ml |
| Phosphoric Acid (85%) | 1.5 ml |

-continued

| | |
|---|---|
| Lysine | 0.3 gm |
| Tyrosine | 0.3 gm |
| CaOH (powder) | 0.8 gm |
| Potassium Hydroxide (8–10% solu) | as required |

The phosphoric acid was mixed into the water (pH 0.7) and the lysine and tyrosine were mixed into the acidified water at room temperature. The CaOH was added to the mixture with mixing (pH 2.7). The pH of the mixture was adjusted with potassium hydroxide until the pH reached 6.8. The precipitate was centrifuged and the solid precipitate modifier was recovered as 60% total solids.

EXAMPLE 2

A mayonnaise was prepared wherein the modifier of Example 1 was used as a total replacer for the egg yolk and a partial replacer for the oil. Otherwise, the composition is similar to commercially prepared mayonnaise. For convenience, the proportions are stated in terms of grams and milliliters. The ingredients of the mayonnaise were:

| | |
|---|---|
| Modifier of Example 1 (60% solids) | 15 gm |
| Water | 20 ml |
| Cider Vinegar | 50 ml |
| Dry Mustard | 2.1 gm |
| Salt | 3.2 gm |
| Red Pepper | .05 gm |
| Soy Bean Oil | 335 gm |

The modifier, water and one-half of the vinegar were combined and homogenized. The mixture was heated to between 80° and 90° F. for about two to three minutes until the mixture was thickened. The thickened mixture was placed in a mixing bowl and the mustard, salt and red pepper were added and mixed. The soy bean oil was slowly added (starting with drop by drop and with increasing rate of addition) while beating the mixture until all of the oil was added and the mixture thickened. The remaining vinegar was slowly added with continued beating for approximately five minutes. The mayonnaise was placed in a refrigerator to cool. The cooled mayonnaise had the appearance, mouth-feel and taste of commercially prepared mayonnaise. The texture was similar to but not quite as smooth as commercially prepared mayonnaise, but was acceptable as a commercially prepared mayonnaise.

EXAMPLE 3

The procedure of Example 2 was repeated except that the modifier was replaced by the whey colloidal precipitate of Example 1 of application Ser. No. 598,873 (wherein both the pH adjustment and heat were used to produce the whey colloidal precipitate). The mayonnaise so produced had all of the appearance, mouth-feel, taste and texture of commercially prepared mayonnaise.

EXAMPLE 4

A whipped topping was prepared wherein the modifier of Example 1 was used as a partial replacer (25% replacer) for both the emulsifiers and caseinate in a commercial formulation for whipped topping (WHIPTRENE*). The ingredients (stated in terms of parts by weight for convenience) were as follows:

| | |
|---|---|
| Soy Bean Oil (Hydrol 100) | 36.5 |
| Fat (105° F. melt-Stearin 17) | 1.65 |
| Mono- and Diglyceride Emulsifier (Durem 204) | 6.75 |
| Flaked Lactated Fatty Acid Esters (glycerol-lacto esters) (Durlac 100-W) | 3.0 |
| Solid Form (Durlac 200) | 2.0 |
| Modifier (60% solids) | 8.1 |
| Dipotassium Phosphate (Buffer) | 2.5 |
| Sodium Caseinate | 3.75 |
| Corn Syrup Solids (carrier) Low Carbohydrate (Prodex-24) | 19.50 |
| Corn Syrup Solids (carrier) High Carbohydrate (Prodex-42) | 19.50 |
| Water | q.e. for/50% solids |

The soy bean oil, fat and emulsifiers were melted to a liquid mixture at 120° F. The modifier, sodium caseinate, dipotassium phosphate and carriers were dissolved in the water with mixing. This water solution was heated to 150° F. and the melted fat mixture was added thereto with mixing. The resulting emulsion was pasteurized at 160° F. for thirty minutes. The pasteurized emulsion was cooled to 125° F. and homogenized in a Manton-Gaulin homogenizer (1500 psi) and fed to a spray drier (320° F. inlet, 180° F. outlet temperature). The spray dried powder was tempered at 0° F. for twenty four hours, 100° F. for seventy two hours and 75° F. for twenty four hours before use.

*Trademark

The tempered powder (35 gms) was mixed with 25 grams of sugar. To this dry blended mixture was added 110 ml of whole chilled milk. The mixture was mixed at a low speed (Hobart mixer) for thirty seconds and then whipped for four minutes at high speed with a wire whip (Hobart wire whip). The overrun was 224. The whip had the stability, appearance, texture, mouth-feel and taste of the commercial WHIPTRENE, but with lower overrun (overrun of commercial product is between 280 and 300).

EXAMPLE 5

The procedure of Example 4 was repeated except that the modifier was replaced by the whey colloidal precipitate of Example 1 of application Ser. No. 598,873 (wherein both the pH adjustment and heat were used to produce the whey colloidal precipitate). The whip had the stability, appearance, texture, mouth-feel, and taste of commercial WHIPTRENE, and had an overrun of 280.

What is claimed is:

1. A food-grade modifier comprising a water-insoluble substantially neutralized solid complex precipitate of calcium, phosphorous, and at least one amino acid selected from the group consisting of tyrosine, lysine and aspartic acid and mixtures thereof, and wherein the pH of the complex precipitate, as measured from the precipitating medium therefore, is at least 5.5 and less than 8.0, the ratio of calcium to amino acid in the complex precipitate is from 5:1 to 0.5:1, and the ratio of calcium to phosphorous in the complex precipitate is from 4:1 to 0.5:1.

2. The modifier of claim 1 wherein the modifier is combined with a food or food-grade material.

3. The modifier of claim 1 wherein up to 50% of the amino acid content of the complex precipitate is at least one amino acid selected from the group consisting of trypophan and phenylalanine.

4. The modifier of claim 1 wherein the complex precipitate has a pH of at least 6.0 and less than 7.5, as measured in the liquid medium from which the precipitate forms.

5. The modifier of claim 1 wherein the complex precipitate is filterable.

6. The modifier of claim 1 or 3 wherein the ratio of calcium to amino acid in the complex precipitate is from 2:1 to 1:1.

7. The modifier of claim 1 or 3 wherein the ratio of calcium to phosphorous in the complex precipitate is from 2:1 to 1:1.

8. The modifier of claim 3 combined with a food or food-grade material.

9. The modifier of claim 1 or 3 wherein the modifier is admixed with a food material which is an oil or fat in the form of a suspension or emulsion with the complex precipitate being at least partially the suspending or emulsifying agent.

10. A process for producing a food-grade modifier comprising:
(a) providing an aqueous precipitating medium;
(b) adding to the medium a calcium-containing compound;
(c) acidifying the medium by adding a phosphorous or phosphoric acid until a pH of 4.0 to 1.0 is reached;
(d) adding to the acidified medium at least one amino acid selected from the group consisting of tyrosine, lysine and aspartic acid;
(e) neutralizing the acidified medium and amino acid with a base until a pH of between 5.5 and 8.0 is reached; and
(f) allowing the complex precipitate to form from the neutralized medium, and
wherein the ratio of calcium to amino acid in the precipitated complex is from 5:1 to 0.5:1, and the ratio of calcium to phosphorous in the precipitated complex is from 4:1 to 0.5:1.

11. A process for producing a food-grade modifier comprising:
(a) providing an aqueous precipitating medium;
(b) acidifying the medium by adding to the medium a phosphorous or phosphoric containing acid until a pH of 4.0 to 1.0 is reached;
(c) adding to the acidified medium at least one amino acid selected from the group consisting of tyrosine, lysine and aspartic acid;
(d) neutralizing the acidified medium and amino acid with a calcium containing compound until a pH of between 5.5 and 8.0 is reached; and
(e) allowing the complex precipitate to form from the neutralized medium, and
wherein the ratio of calcium to amino acid in the precipitated complex is from 5:1 to 0.5:1, and the ratio of calcium to phosphorous in the precipitated complex is from 4:1 to 0.5:1.

12. The process of claims 10 or 11 wherein the acid is phosphorous or phosphoric acid.

13. The process of claim 10 wherein the acidified medium and amino acid are neutralized with an alkaline or alkaline earth base or ammonium hydroxide.

14. The process of claims 10 or 11 wherein the amino acid added also contains at least one amino acid selected from the group consisting of trytophan and phenylalanine.

15. The process of claims 10 or 11 wherein the complex precipitate is filtered from the neutralized medium.

16. The process of claims 10 or 11 wherein the ratio of calcium to amino acid is from 2:1 to 1:1.

17. The process of claims 10 or 11 wherein the ratio of calcium to phosphorous is from 2:1 to 1:1.

18. The process of claims 10 or 11 wherein the aqueous precipitating medium is water.

19. The process of claims 10 or 11 wherein the pH of the acidified medium is 3.0 or less.

20. The process of claims 10 or 11 wherein the complex precipitate and medium are added to a food or food-grade material.

21. The process of claims 10 or 11 wherein the complex precipitate is filtered from the neutralized medium and the filtered complex precipitate is added to a food or food-grade material.

* * * * *